(12) United States Patent
Zhang et al.

(10) Patent No.: US 10,446,116 B2
(45) Date of Patent: Oct. 15, 2019

(54) TEMPERATURE SENSOR ON DISPLAY ACTIVE AREA

(71) Applicant: Apple Inc., Cupertino, CA (US)

(72) Inventors: Sheng Zhang, Milipitas, CA (US);
Chaohao Wang, Sunnyvale, CA (US);
Cheuk Chi Lo, Belmont, CA (US);
Chun-Yao Huang, San Jose, CA (US);
Howard Tang, San Diego, CA (US);
Paolo Sacchetto, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/673,138

(22) Filed: Aug. 9, 2017

(65) Prior Publication Data

US 2018/0090103 A1 Mar. 29, 2018

Related U.S. Application Data

(60) Provisional application No. 62/399,086, filed on Sep. 23, 2016.

(51) Int. Cl.
*G09G 5/10* (2006.01)
*G01K 13/00* (2006.01)
(Continued)

(52) U.S. Cl.
CPC .............. *G09G 5/10* (2013.01); *G01K 1/026* (2013.01); *G01K 7/01* (2013.01); *G01K 7/18* (2013.01);
(Continued)

(58) Field of Classification Search
CPC ..... G09G 2320/041; G09G 2320/0626; G09G 2320/0666; G09G 2320/0233; G09G 3/3413; G09G 2320/0693
See application file for complete search history.

(56) References Cited

U.S. PATENT DOCUMENTS

| 4,243,898 A | * | 1/1981 | Seelbach | ................ G01R 17/10 |
|             |   |        |          | 323/313 |
| 5,483,261 A |   | 1/1996 | Yasutake |  |

(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Koosha Sharifi-Tafreshi
(74) *Attorney, Agent, or Firm* — Kubota & Basol LLP

(57) ABSTRACT

An apparatus is disclosed. In some examples, the apparatus comprises a display panel comprising a plurality of display pixels. In some examples, the apparatus comprises a plurality of temperature sensors disposed at different portions the display panel, wherein the plurality of temperature sensors comprise ratioed pairs of thin film transistors and the ratioed pairs of thin film transistors are formed on the display panel. In some examples, the apparatus comprises control circuitry for changing illumination properties of the plurality of display pixels based on changes is temperature detected by a proximate temperature sensor of the plurality of temperature sensors. In some examples, the ratioed pairs of thin film transistors are operated in a sub-threshold mode.

17 Claims, 12 Drawing Sheets

(51) Int. Cl.
  *G01K 7/34* (2006.01)
  *G09G 3/20* (2006.01)
  *G01K 1/02* (2006.01)
  *G01K 7/01* (2006.01)
  *G01K 7/18* (2006.01)
  *G06F 3/044* (2006.01)
  *G09G 3/36* (2006.01)
  *G09G 3/3225* (2016.01)
  *G09G 3/34* (2006.01)

(52) U.S. Cl.
  CPC ............... *G01K 7/34* (2013.01); *G01K 13/00* (2013.01); *G09G 3/2003* (2013.01); *G06F 3/044* (2013.01); *G09G 3/3225* (2013.01); *G09G 3/3413* (2013.01); *G09G 3/3607* (2013.01); *G09G 3/3648* (2013.01); *G09G 2300/0426* (2013.01); *G09G 2300/0452* (2013.01); *G09G 2310/0251* (2013.01); *G09G 2320/0242* (2013.01); *G09G 2320/041* (2013.01); *G09G 2320/0626* (2013.01); *G09G 2320/0666* (2013.01); *G09G 2320/0693* (2013.01); *G09G 2330/021* (2013.01); *G09G 2330/023* (2013.01)

(56) References Cited

U.S. PATENT DOCUMENTS

| | | |
|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 6,770,881 B2 | 8/2004 | Iida et al. |
| 7,015,894 B2 | 3/2006 | Morohoshi |
| 7,184,064 B2 | 2/2007 | Zimmerman et al. |
| 7,361,899 B2 | 4/2008 | Iida |
| 7,663,607 B2 | 2/2010 | Hotelling et al. |
| 8,399,951 B2 | 3/2013 | Takatori |
| 8,479,122 B2 | 7/2013 | Hotelling et al. |
| 8,681,134 B2 | 3/2014 | Mamba et al. |
| 9,222,838 B2 | 12/2015 | Horiuchi |
| 2006/0197753 A1 | 9/2006 | Hotelling |
| 2007/0109246 A1* | 5/2007 | Tanaka ................ G09G 3/3648 345/98 |
| 2007/0229443 A1* | 10/2007 | Sawada ................ G09G 3/3611 345/101 |
| 2008/0175068 A1* | 7/2008 | Houston ................ G11C 5/143 365/185.27 |
| 2013/0279537 A1 | 10/2013 | Tang |
| 2014/0341257 A1* | 11/2014 | Bernardinis ......... G01D 5/2454 374/178 |
| 2016/0027412 A1 | 1/2016 | Igawa |
| 2016/0086540 A1* | 3/2016 | Kim ..................... G09G 3/3233 345/214 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

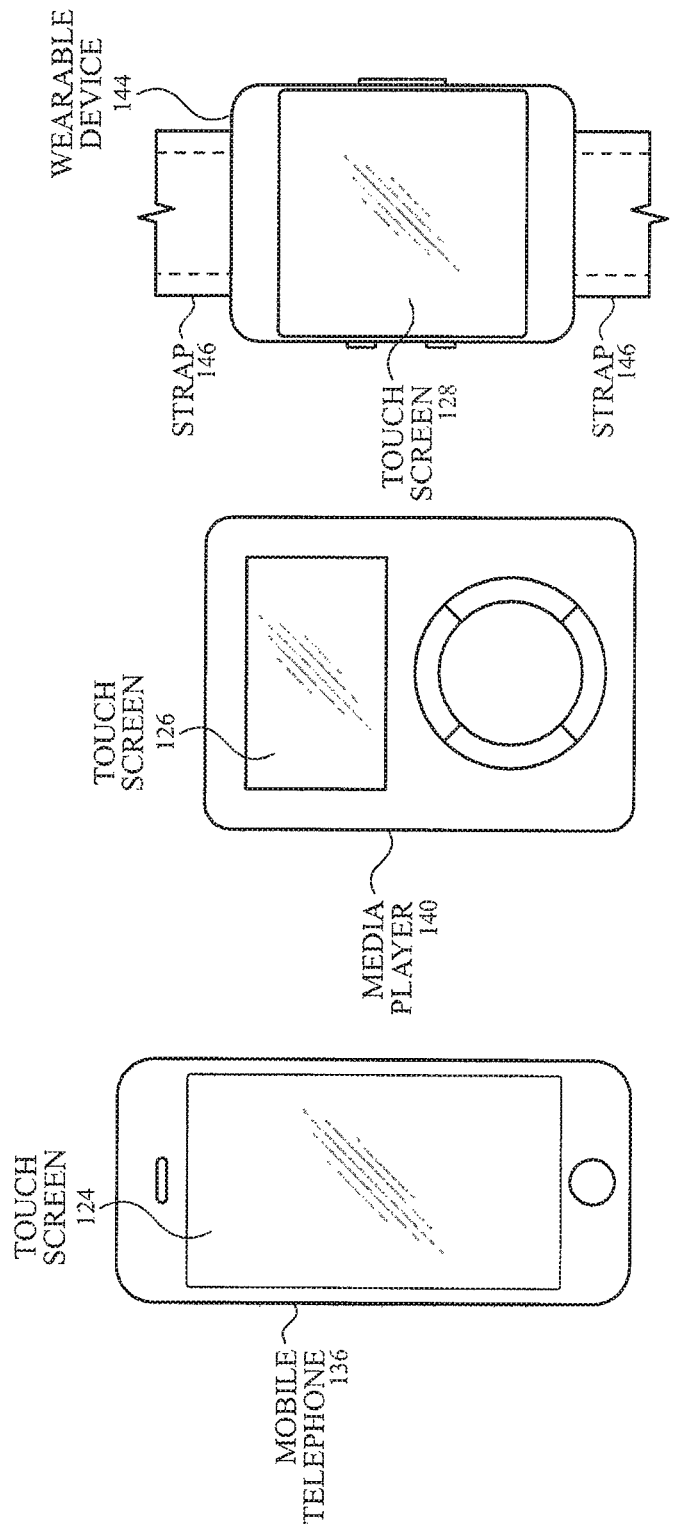

| SENSOR | W (μm) | S (μm) | L (μm) | M |
|---|---|---|---|---|
| 732 | 4 | 4 | 150 | 20 |
| 734 | 8 | 4 | 300 | 20 |
| 736 | 12 | 4 | 450 | 20 |

TEMPERATURE SENSOR ON DISPLAY ACTIVE AREA

CROSS-REFERENCE TO RELATED APPLICATIONS

This application claims benefit of U.S. Provisional Patent Application No. 62/399,086, filed Sep. 23, 2016, which is hereby incorporated by reference in its entirety.

FIELD OF THE DISCLOSURE

This relates generally to electronics devices with displays, and more particularly to electronic devices with displays calibrated using temperature sensors.

BACKGROUND OF THE DISCLOSURE

Electronic devices such as computers, media players, cellular telephones, set-top boxes, and other electronic equipment can include displays for displaying visual information. Displays can be capable of displaying color images. In some instances, the color response of a display can change as the display operates. For example, changing operating conditions (e.g., display temperature) can affect the color response of the display. Some displays can depict white as somewhat yellowish when initially powered on and cold. As the display warms, the white point of the display can shift towards a more neutral white. Other display colors such as skin tone colors can also experience shifts within a color space as the temperature of the display changes. Similarly, other parameters such as luminance, black level, contrast, and/or electro-optical transfer function of the display can shift as a function of temperature.

The shift in color profile due to temperature changes in the display can cause one or more pixels in the display to change color until a stable operating temperature can be achieved. That is, although a display pixel may have a target color, which can remain the same for the initial temperature and the stable operating temperature, the actual color displayed, as objectively measured by its chromaticity and luminance, can vary. Displays can be calibrated to account for temperature induced color shifts by, for example, applying adjustment factors to display pixel values based on temperature(s) measured by one or more temperature sensors.

SUMMARY OF THE DISCLOSURE

This relates to one or more temperature sensors included in a display and methods for operating thereof. Examples of the disclosure can include one or more temperature sensors located in close proximity (e.g., on the TFT glass) to pixel material, thereby reducing temperature differences (e.g., between measured and actual temperatures) and sensing errors. In some examples, the TFT array and/or conductive material in the active area of the touch screen can be utilized for implementing the temperature sensors. The one or more temperature sensors can be configured to measure a $V_{GS}$ difference across a pair of transistors, a current indicative of temperature-dependent mobility, and/or the resistance, indicative of temperature, of a conductive material.

BRIEF DESCRIPTION OF THE DRAWINGS

FIGS. 1A-1C illustrate systems in which examples of the disclosure can be implemented.

DETAILED DESCRIPTION

Figure 2A:
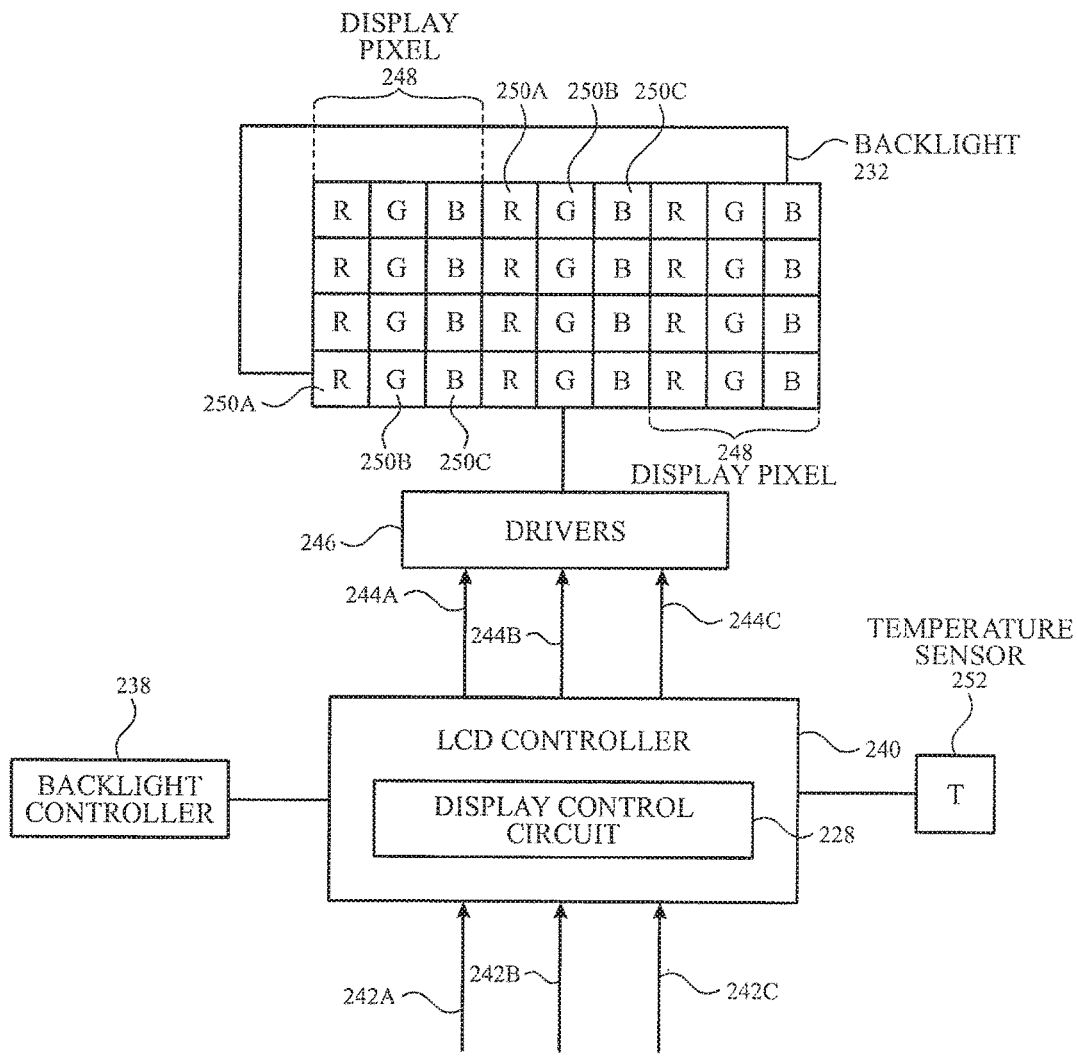
FIG. 2A illustrates a block diagram of an exemplary display and various included components according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order.

Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Electronic devices such as cellular telephones, media players, computers, set-top boxes, wireless access points, and other electronic equipment can include displays. Displays can be used to present visual information and status data and/or may be used to gather user input data. The displays can be configured to display color images. For example, displays can include color display pixels configured to create colored light. Individual pixels of a display can receive a red, green, and blue value that can together define the color to be created by the pixel. These red, green, and blue values can be sometimes referred to herein as "RGB value."

Without compensation, display colors can shift within a color space as the temperature of the display varies. To account for changes in display operating temperature, display colors can be adjusted using one or more adjustment values. For example, an adjustment value can be applied to an input RGB value to obtain an adapted RGB value that can account for changes in display temperature. The adjustment value can be stored in a look-up table or can be computed by interpolating from the values found in the table, for example. The adjustment value can be applied, depending on the type of display, to a RGB value that can be supplied to a display pixel or to the gain of a red channel, green channel, and blue channel to adjust the colors of the display. Display colors can be corrected as the display warms up, for example, and changes temperature. Display performance information (e.g., luminance and chromaticity values) can be recorded for different RGB input values.

This relates to one or more temperature sensors included in a display and methods for operating thereof. Examples of the disclosure can include one or more temperature sensors located in close proximity (e.g., on the TFT glass) to pixel material, thereby reducing temperature differences and sensing errors. In some examples, the TFT array and/or conductive material in the active area of the touch screen can be utilized for implementing the temperature sensors. The one or more temperature sensors can be configured to measure a $V_{GS}$ difference across a pair of transistors, a current indicative of temperature-dependent mobility, and/or the resistance, indicative of temperature, of the conductive material.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146. The systems of FIGS. 1A-1C can utilize the temperature sensors, configurations, and methods for operation thereof, as will be disclosed.

Touch screen 124, touch screen 126, and/or touch screen 128 can include a display that can incorporate capacitive touch electrodes or other touch components. In some examples, the systems can include a display that is not touch-sensitive. The display can include image pixels formed from light-emitting diodes (LEDs), organic light-emitting diodes (OLEDs), plasma cells, electrophoretic display elements, electrowetting display elements, liquid crystal display (LCD) components, or other suitable image pixel structures. Arrangements in which the display is formed using LCD pixels are sometimes described herein as an example. This is, however, merely illustrative. Any suitable type of display technology can be used in forming the display if desired. The touch screen can be substantially filled with active display pixels or may have an active portion or an inactive portion.

Figure 2B:
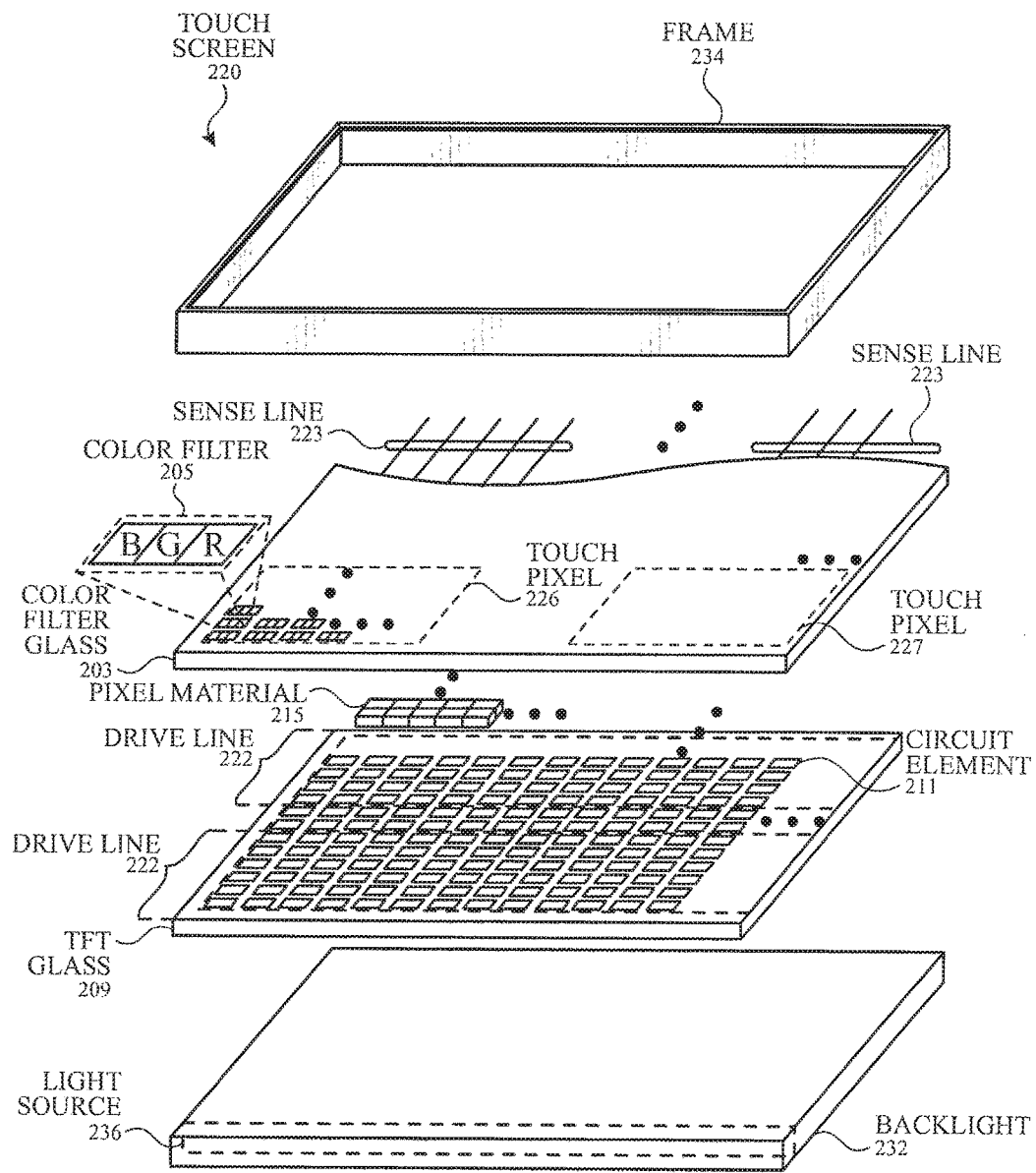
FIG. 2B illustrates a perspective view of an exemplary stackup included in a touch screen according to examples of the disclosure.

FIG. 2A illustrates a block diagram of an exemplary display and various included components according to examples of the disclosure. FIG. 2B illustrates a perspective view of an exemplary stackup included in a touch screen according to examples of the disclosure. Touch screen 220 can include a backlight controller 238 that can govern operation of backlight 232. For example, backlight controller 238 can include one or more driver integrated circuits that can power and drive light source 236.

Touch screen 220 can include a LCD controller 240 that can govern operation of pixel material 215. For example, LCD controller 240 can receive image data through input channels 242A, 242B, and 242C of touch screen 220. In some examples, the image data can be sent to touch screen 220 from a graphics card, controller, or processor through an I/O controller. Each input channel 242A, 242B, and 242C can correspond to a different color channel of touch screen 220. For example, input channel 242A can be a red input channel; input channel 242B can be a green input channel; and input channel 242C can be a blue input channel. LCD controller 240 can process the image data received through channels 242A, 242B, and 242C and can provide the processed image data to drivers 246 in the form of output signals 244A, 244B, and 244C. Each output signal 244A, 244B, and 244C can represent the processed image data from a corresponding input channel 242A, 242B, and 242C. In some examples, LCD controller 240 can include control circuitry and/or one or more microprocessors for processing the image data.

Each display pixel 248 can include a set of subpixels 250A, 250B, and 250C, each capable of emitting a discrete color. For example, subpixels 250A can emit red light; subpixels 250B can emit green light; and subpixels 250C can emit blue light. Each subpixel 250A, 250B, and 250C can display image data from the corresponding output signal 244A, 244B, and 244C, respectively. A number of colors can be displayed by each pixel 248 by varying the individual intensity levels of the subpixels 250A, 250B, and 250C.

Touch screen 220 can include other light-emitting components such as reflective components, liquid crystal display (LCD) components, organic light-emitting diode (OLED) components, or other suitable display pixel structures. To provide touch screen 220 with the ability to display color images, the light-emitting components can have color filter elements. Each color filter element can be used to impart color to the light associated with a respective display pixel 248.

Display control circuit 228 can also include display driver circuitry. Display driver circuitry can be implemented using one or more integrated circuits (ICs) and may sometimes be referred to as a driver IC, display driver integrated circuit, or display driver. Display driver circuitry may include, for example, timing controller (TCON) circuitry such as a TCON integrated circuit. If desired, display driver circuitry can be mounted on an edge of a thin-film-transistor (TFT) substrate layer (e.g., TFT glass 209) in touch screen 220, for example. Display control circuit 228 can be coupled to additional circuitry (e.g., storage and processing circuitry).

There can be tens, hundreds, or thousands of rows and columns of display pixels 248. Each pixel 248 can, if desired, be a color pixel such as a red (R) pixel, a green (G) pixel, a blue (B) pixel or a pixel of another color. Red pixels R, for example, can include a red color filter element (e.g., color filter 205) over a light generating element (e.g., a liquid crystal pixel or an OLED pixel element) that can absorb and/or reflect non-red light while passing red light. This is, however, merely illustrative. Display pixels 248 can include any suitable structures for generating light of a given color. For example, display pixels 248 can include a pattern of cyan, magenta, and yellow pixels or can include any other suitable pattern of colors. Arrangements of display pixels 248 including a pattern of red, green, and blue pixels are sometimes desired herein as an example.

Display control circuit 228 such as a display driver integrated circuit and, if desired, associated thin-film transistor circuitry formed on a display substrate layer can be used to produce signals such as data signals and gate line signals (e.g., on data lines and gate lines respectively in touch screen 220) for operating display pixels (e.g., turning display pixels 248 on and/or off and/or adjusting the intensity of display pixels 248). During operation, display control circuit 228 can control the values of the data signals and gate signals to control the light intensity associated with each of the display pixels and to thereby display images on touch screen 220.

Display control circuit 228 can be used to convert input RGB values for each display pixel 248 into analog display signals for controlling the brightness of each display pixel. Control circuitry (e.g., storage and processing circuitry) can provide input RGB values (e.g., integers with values ranging from 0 to 255) that can correspond to the desired pixel intensity of each pixel 248 to display control circuit 228. For example, a digital display control value of 0 may result in an "off" pixel, whereas a digital display control value of 255 may result in a display pixel operating at a maximum available power.

Display control circuit 228 can be used to concurrently operate display pixels 248 of different colors in order to generate light having a color that is a mixture of, for example, primary colors: red, green, and blue. For example, operating red pixels R and blue pixels B at equal intensities can generate light that appears violet; operating red pixels R and green pixels G at equal intensities can generate light that appears yellow; operating red pixel R and green pixels G at half of maximum intensity can generate light that appears yellowish; and operating red pixels R, green pixels G, and blue pixels B simultaneously at maximum intensity can generate light that appears white, etc.

Touch screen 220 can also include one or more temperature sensors 252. Temperature sensors 252 can be internal sensors configured to gather temperature information. For example, temperature sensors 252 can be used to measure display temperature, display cover material temperature (e.g., the temperature associated with a cover material that covers touch screen 220), backlight temperature (e.g., the temperature associated with light-emitting diodes that provide the backlight for touch screen 220), internal component temperature (e.g., the temperature associated with an internal component of the device), etc.

Temperature sensors 252 can be configured to measure the temperature at different locations on touch screen 220. For example, temperature sensors 252 can be included in TCON circuitry, which can be mounted on one or more locations (e.g., an edge) of a TFT substrate layer in touch screen 220, for example. Additionally or alternatively, temperature sensors 252 can be included located at other locations of the display. Touch screen 220 can include a backlight 232 that can function as a light source for displaying one or more images and can be assembled within frame 234. In some examples, frame 234 can be included in a housing of the device.

Color filter glass 203 can include a plurality of color filters 205. In some examples, color filters 205 can include three colors: blue (B), green (G), and red (R), such as in a RGB display. Color filter glass 203 can also include one or more electrodes for touch sensing (e.g., sense line 223). TFT glass 209 can include circuit elements 211. Circuit elements 211 can be, for example, multi-function circuit elements that can operate as part of the display circuitry (e.g., LCD controller 240) of the touch screen 220 and also as part of the touch sensing circuitry of the touch screen 220. In some examples, circuit element 211 can be single-function circuit elements that can operate only as part of the touch sensing system. In addition to circuit elements 211, other circuit elements (not shown) can be formed on TFT glass 209, such as transistors, capacitors, conductive vias, data lines, gate lines, etc. Circuit elements 211 and other circuit elements formed on TFT glass 209 can operate together to perform various display functionality required for the type of display technology used by touch screen 220. The circuit elements can include, for example, elements that can exist in LCD displays. Some of the circuit elements 211 can be electrically connected together to form touch electrodes (e.g., drive lines 222). Although color filter glass 203 and TFT glass 209 are referred to as "glass," examples of the disclosure can include any type of transparent substrates capable of supporting the components including, but not limited to, plastic.

Pixel material 215 can be disposed between TFT glass 209 and color filter glass 203. Pixel material 215 can be separate regions or cells above circuit elements 211. For example, when the pixel material is a liquid crystal, these regions or cells are meant to illustrate regions of the liquid crystal controlled by the electric field produced by the pixel electrode and common electrode of the region or cell under consideration. Pixel material 215 can be a material that, when operated on or by the display circuitry of touch screen 220, can generate or control an amount, color, etc., of light produced by each display pixel. For example, in a LCD touch screen, pixel material 215 can be formed of liquid crystal, with each display pixel controlling a region or cell of the liquid crystal. In this case, for example, various methods can exist for operating liquid crystal in a display operation to control the amount of light (from backlight 232) emanating from each display pixel 248 (e.g., by applying an electric field in a particular direction depending on the type of LCD technology employed by the touch screen). In an in-plane switching (IPS), fringe field switching (FFS), and advanced fringe field switching (AFFS) LCD displays, for example, electrical fields between pixel electrodes and common electrodes (Vcom) disposed on the same side of liquid crystal can operate on the liquid crystal material to control the amount of light from backlight 232 that can pass through the display pixel. In an OLED (organic light emitting diode) display, for example, pixel material 215 can be an organic material that can generate light when a voltage is applied across the material.

Backlight 232 can include one or more light sources 236, as well as other components such as a light guide and optical films that can direct light from light source 236 towards pixel material 215. In some examples, light source 236 can include a cold-cathode fluorescent lamp (CCFL), one or more LEDs, OLEDs, or any other suitable source of light.

Backlight 232 can be an edge-lit backlight that includes one light source 236 located at an edge of touch screen 220. In some examples, multiple light sources 236 can be disposed around one or more edges of touch screen 220. In some examples, instead of an edge-lit backlight, the backlight can be a direct-light backlight with one or more light sources 236 mounted behind pixel material 215.

Display calibration information such as color-specific and temperature-specific adjustment values can be loaded onto the device during manufacturing, for example. The stored adjustment values can be used to adjust display colors in order to compensate for changes in display temperature. Adjustment values can be stored in any suitable location in the device. For example, adjustment values can be stored in display control circuit 228.

In some examples, a display TCON integrated circuit (included in display control circuit 228) can receive input RGB values and can receive display temperature information from temperature sensors 252. Based on the input RGB values and temperature information, the TCON integrated circuit can determine a color-specific and temperature-specific adjustment value for each input RGB value. The TCON integrated circuitry can apply the adjustment values to either the input RGB values or to the gain control of the RGB channels. The adjustment values can change the display colors such that the display colors appear as the target color.

Due to variations in display temperature, some internal parameters of the display can change, which can in turn affect the luminance and/or the chromaticity of the displayed color, even if the RGB input signal has not changed. For example, displayed color can vary with temperature. At an initial power-on state, a display can have an initial white point that can appear on the display as a yellowish color. As time passes, the physical display temperature can change (e.g., increase to a stable value). The increase in display temperature can induce a corresponding change in the display white point. For example, as the display warms up to a stable operating temperature, the display white point may shift and may appear as a neutral white. If the display continues to warm up beyond a stable operating temperature, the display white point may appear slightly blue.

Displays can sometimes be calibrated to minimize temperature induced white point shifts. Methods can include applying adjustment values to RGB input values based on a temperature measured at the center of the display. During calibration operations, information can be gathered from the device such as temperature information measured using temperature sensors 252. Temperature sensor 252 can, for example, be an internal sensor in the device. Temperature sensor 252 can be used to measure any suitable temperature associated with the device (e.g., display temperature, display cover material temperature, backlight temperature, internal component temperature, etc.).

Although temperature sensors can be located, for example, on the main logic board, on a board that excludes the LCD controller (e.g., in TCON circuitry), and/or along one or more areas of the housing frame, a difference can exist between the actual temperature of a display pixel and temperature measured at the temperature sensors. Examples of the disclosure can include one or more temperature sensors located in close proximity (e.g., on the TFT glass) to pixel material, thereby reducing temperature differences and sensing errors. In some examples, the TFT array and/or conductive material in the active area of the touch screen can be utilized for implementing the temperature sensors.

Figure 3:
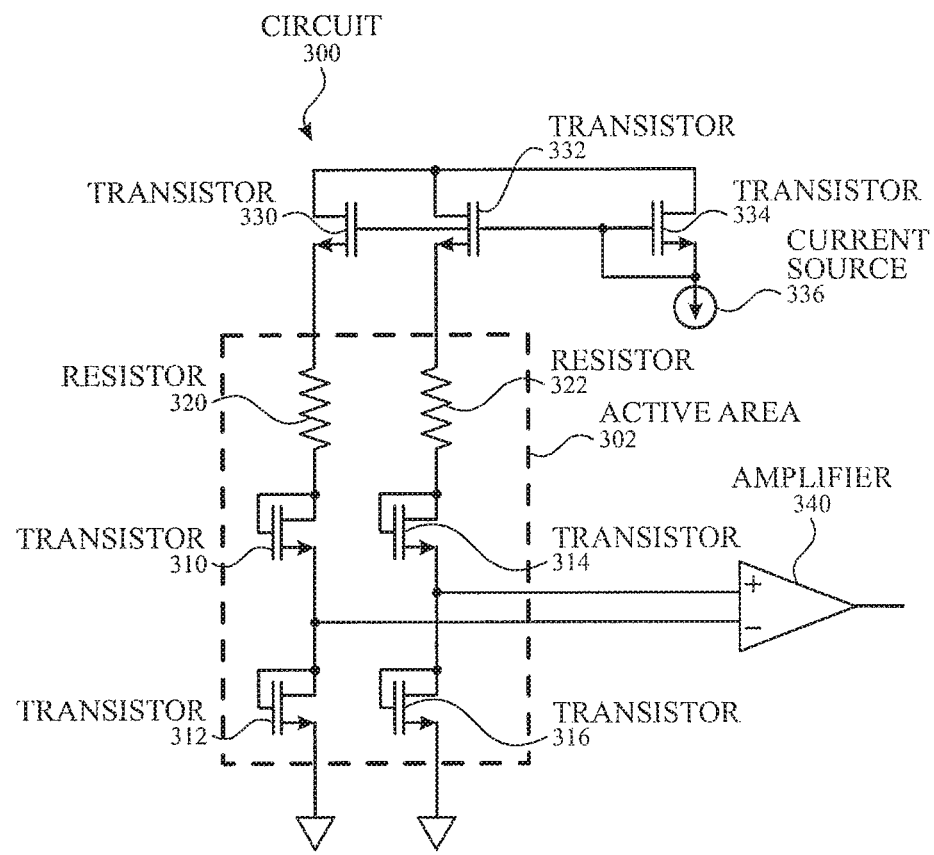
FIG. 3 illustrates an exemplary circuit for measuring the temperature of the display pixels according to examples of the disclosure.

FIG. 3 illustrates an exemplary circuit for measuring the temperature of the display pixels according to examples of the disclosure. In some examples, the temperature sensors can be configured to measure the $V_{GS}$ difference of a ratioed TFT pair biased under constant current. Circuit 300 can include a plurality of transistors (e.g., transistor 310, transistor 312, transistor 314, and transistor 316) and resistors (e.g., resistor 320 and resistor 322) located in the active area 302 of the display. For transistor 310, the drain can be directly connected to resistor 320 (e.g., a routing resistance between the current source and transistor 310); the gate can be connected to the drain; and the source can be directly connected to the drain of transistor 312. For transistor 312, the drain can be directly connected to the source of transistor 310, and the gate can be connected to the drain. For transistor 314, the drain can be directly connected to resistor 322 e.g., a routing resistance between the current source and transistor 314); the gate can be connected to the drain; and the source can be directly connected to the drain of transistor 316; and. For transistor 316, the drain can be directly connected to the source of transistor 314, and the gate can be connected to the drain. In this manner, two pairs of TFTs can be included in active area 302.

The size of transistor 310, transistor 312, transistor 314, and transistor 316 can be configured with desired W/L (width to length) ratios. In some examples, the transistors can be configured such that the lengths are the same, but the widths have a certain ratio relationship for achieving the desired W/L ratio for each transistor. For example, the width of transistor 310 can be smaller than the width of transistor 314, where the ratio of the widths can be 1:M. The width of transistor 312 can be greater than the width of transistor 316, where the ratio of the widths can be M:1. In some examples, the voltage levels at the drain of transistor 310 and the drain of transistor 314 can be the same, such that the voltage levels "seen" by current source 336 (i.e., the voltage at the source of each of the current mirror transistors 330 and 332) can also be the same. In some examples, resistor 320 and resistor 322 can have the same resistance values. It should be understood from the above that by maintaining a constant length for the transistors 310, 312, 314, and 316 above, changing the values of W can produce a desired value of W/L. In the above described configuration, the ratio of W/L between transistors 312 and 316 can be M:1 and the ratio of W/L between transistors 310 and 314 and be 1:M. It should be understood that the same ratios of W/L can be achieved by changing value of W, L, or both for the transistors 310, 312, 314, and 316.

Circuit 300 can further include one or more additional transistors (e.g., transistor 330, transistor 332, and transistor 334) and at least one source (e.g., source 336). The additional transistors and current source can supply a current through each pair of TFTs. The transistors 330 and 332 can act as current mirrors for the current supplied by current source 336, and can be configured to provide equal current to both transistor pairs 310/312 and 314/316 respectively. An amplifier 340 can be electrically coupled to the TFT pairs, and a $V_{GS}$ difference between transistor 312 and transistor 316 can be measured. In some examples, amplifier 340 can be a differential amplifier. Based on the $V_{GS}$ difference $\Delta V_{GS}$, the temperature of the display and/or touch sensor panel at the location of the TFT pairs can be determined using, for example, Equation 1:

$$\Delta V_{GS}(T_g) = \sqrt{\frac{I_{d2}(T_b)}{\mu_{02}(T_g)C_{ox}\frac{W_2}{L_2}}} - \sqrt{\frac{I_{d1}(T_b)}{\mu_{01}(T_g)C_{ox}\frac{W_1}{L_1}}} \quad (1)$$

where $I_{d1}$ and $I_{d2}$ can be equal to the currents supplied by source 336 and mirrored by transistors 330 and 332, $\mu_{o1}$ and $\mu_{o2}$ can be the carrier mobility, $W_1$ and $W_2$ can be the widths, $L_1$ and $L_2$ can be the lengths, $C_{ox}$ can be the oxide capacitance, $T_b$ can be the temperature of the current mirror transistors 330 and 332, and $T_g$ can be the glass temperature (e.g., TFT glass 209 illustrated in FIG. 2B). The mobility can be affected by the temperature, which can be accounted for when determining the temperature $T_g$ from the measured $V_{GS}$. As shown by the equation, $\Delta V_{GS}$ can have a non-linear relationship with respect to temperature $T_g$ of the transistors.

Figure 4A:
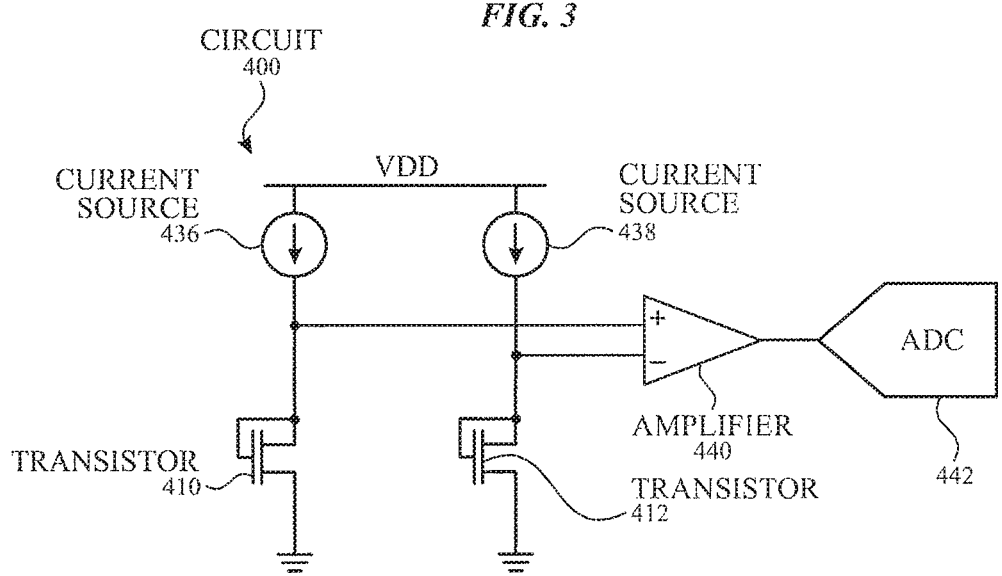
FIG. 4A illustrates an exemplary circuit for measuring the temperature of the display pixels according to examples of the disclosure.

FIG. 4A illustrates a second exemplary circuit for measuring the temperature of the display pixels according to examples of the disclosure. In some examples, the temperature sensors can be configured to measure a $V_{GS}$ difference for two TFTs based on the exponential relationship to the bias current in a subthreshold bias region. Circuit 400 can include a plurality of transistors (e.g., transistor 410 and transistor 412) and a plurality of current sources (e.g., current source 436 and current source 438). In some examples, transistor 410 and transistor 412 can be located in the active area (e.g., active area 302 illustrated in FIG. 3) of the display. For transistor 410, the drain can be directly connected to current source 436; the gate can be connected to the drain; and the source can be connected to ground. For transistor 412, the drain can be directly connected to current source 438; the gate can be connected to the drain; and the source can be connected to ground. The size of transistor 410 and transistor 412 can be configured such that the W/L ratio of the transistors can have a desired relationship. For example, the W/L ratio of transistor 410 can be smaller than the W/L ratio of transistor 414, where the ratio of W/L can be 1:M (where M is an integer).

Current source 436 and current source 438 can be configured to supply different currents to transistor 410 and transistor 412, respectively. For example, current source 436 can be configured to supply a current that is (an integer) N times greater than the current supplied by current source 438. In some examples, N can be equal to the inverse of the M (i.e., N=1/M, where M is related to the ratio of the W/L of transistor 410 and transistor 412). It should be understood that based on the sizing and bias relationships described above, the transistor 410 can have a current density N*M times greater than transistor 412.

Figure 4B:
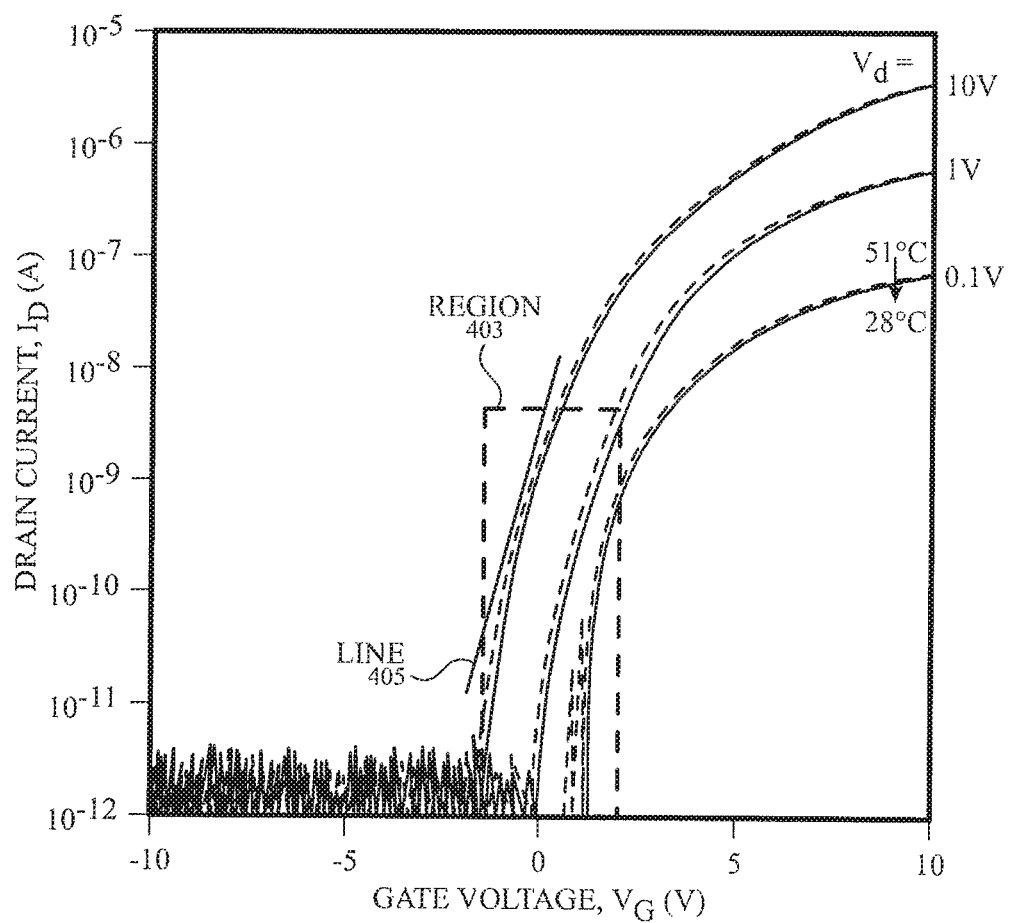
FIG. 4B illustrates an exemplar plot of temperature and voltage dependent relationships between gate voltage and drain current of a transistor according to examples of the disclosure.

The transistors 410 and 412 can be biased at a low current level such that $V_{GS}$ can be determined by the exponential relationship to the bias current (e.g., in a subthreshold region of operation). As illustrated in FIG. 4B, the bias current level for transistors 410 and 412 can include a current in region 403, which can be a region where the logarithmic plot of drain current $I_D$ with respect to the gate voltage $V_g$ can have a linear relationship. The linear relationship is illustrated with line 405 having a slope equal to 1/SS, where SS is equal to subthreshold swing (i.e., thermal voltage kT/q).

An amplifier 440 can be electrically coupled to transistor 410 and transistor 412, and a $V_{GS}$ difference between the two transistors can be measured. In some examples, amplifier 340 can be a differential amplifier. Based on the $V_{GS}$ difference $\Delta V_{GS}$, the temperature of the display and/or touch sensor panel at the location of the transistors can be determined using, for example, Equations 2-5:

$$N \times I_{bias} = I_0 \times e^{\frac{V_{GS1}}{SS}} \qquad (2)$$

$$I_{bias} = MI_0 \times e^{\frac{V_{GS2}}{SS}} \qquad (3)$$

$$\ln\left(\frac{N \times I_{bias}}{I_{bias}/M}\right) = \frac{\Delta V_{GS}}{SS} \qquad (4)$$

$$\Delta V_{GS} = \ln(N \times M) \times SS = \ln(NM) \times \frac{kT_g}{q} \qquad (5)$$

where $I_{bias}$ is the current supplied by source 438, N and M can be integers related to the relative widths of transistor 410 and transistor 412 (discussed above), $V_{GS1}$ and $V_{GS2}$ can be the $V_{GS}$ values measured by amplifier 440, and SS can be the subthreshold swing (related to the temperature of the transistors $T_g$).

Figure 5A:
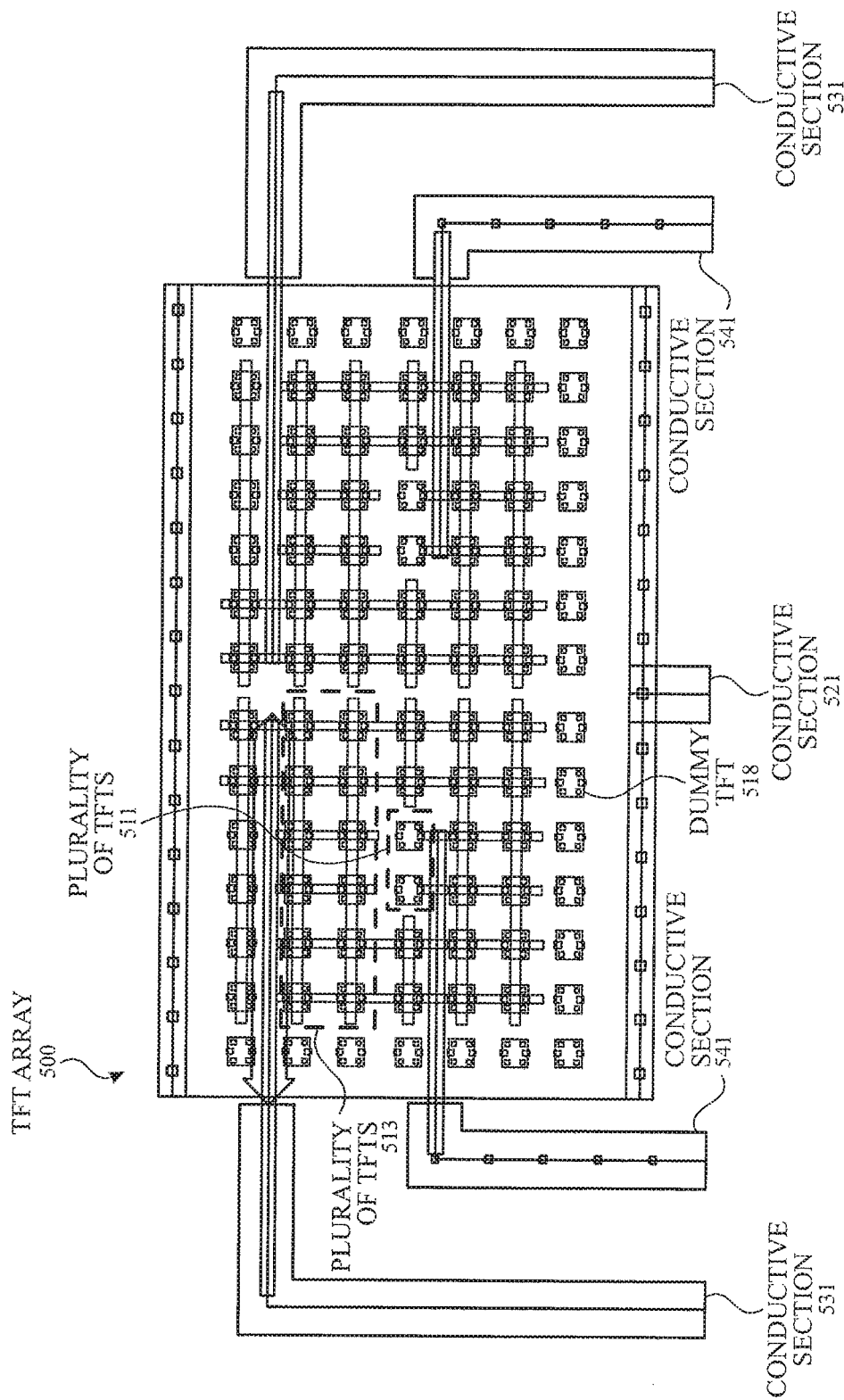
FIG. 5A illustrates a top view of an exemplary layout of one or more temperature sensors according to examples of the disclosure.

FIG. 5A illustrates a top view of an exemplary layout of one or more temperature sensors according to examples of the disclosure. TFT array 500 can include plurality of TFTs 511 and plurality of TFTs 513. Plurality of TFTs 511 and plurality of TFTs 513 can include a plurality of transistors electrically coupled together. For example, the gates in all of the plurality of TFTs 511 can be electrically coupled together. In some examples, plurality of TFTs 511 can include transistors having one or more of the same characteristics as the transistors included in plurality of TFTs 513. The number of electrically-coupled transistors included in plurality of TFTs 511 can be less than the number of electrically-coupled transistors included in plurality of TFTs 513. For example, X (e.g., 2) number of electrically-coupled transistors can be included in plurality of TFTs 511, while Y (e.g., where Y=X×M) number of electrically-coupled transistors can be included in plurality of TFTs 513. The factor M can correspond to the 1:M and M:1 ratios of W/L described above in FIGS. 3 and 4. Plurality of TFTs 511 can have the same operation and characteristics as transistor 310 (illustrated in FIG. 3), transistor 312 (illustrated in FIG. 3), and/or transistor 410 (illustrated in FIG. 4A); plurality of TFTs 513 can have the same operation and characteristics as transistor 314 (illustrated in FIG. 3), transistor 316 (illustrated in FIG. 3) and/or transistor 412 (illustrated in FIG. 4A).

Plurality of TFTs 511 can be electrically coupled to conductive section 541. Conductive section 541 can be coupled to an amplifier (e.g., amplifier 340 illustrated in FIG. 3 or amplifier 440 illustrated in FIG. 4A). Plurality of TFTs 513 can be electrically coupled to conductive section 531. Conductive section 531 can be coupled to one or more current sources (e.g., current source 336 illustrated in FIG. 3, current source 436 illustrated in FIG. 4A, or current source 438 illustrated in FIG. 4A). Conductive section 521 can be provided for providing a grounded connection to the substrate of TFTs 511 and 513. Conductive section 531, conductive section 541, and conductive section 521 can be, for example, routing traces.

In some examples, one or more of the transistors can be located on the same substrate. The substrate can be, for example, a color filter glass (e.g., color filter glass 203 illustrated in FIG. 2B), a TFT glass (e.g., TFT glass 209 illustrated in FIG. 2B), or a separate substrate located in close proximity to the display. Although FIG. 5A illustrates the TFTs as being located in close proximity (e.g., adjacent) to each other, examples of the disclosure can include one or more other (e.g., non-TFT) components located between the TFTs. For example, some of the plurality of TFTs can be located on a first side (e.g., left side) of the TFT glass, while others of the plurality of TFTs can be located on a second side (e.g., right side) of the TFT glass). Additionally or alternatively, one or more of the non-TFT components including, but not limited to, the amplifier, one or more sources, and routing traces can be located on a separate substrate (e.g., logic board).

TFT array 500 can further include one or more dummy TFTs 518. Dummy TFTs 518 can be the same type of transistors as those included in plurality of TFTs 511 and/or plurality of TFTs 513. In some examples, dummy TFTs 518 can be floating (e.g., not electrically coupled to a source or other transistors) or coupled to ground. Dummy TFTs 518 can be located around the edges of the substrate to account for edge variations during manufacture, for example.

Figure 5B:
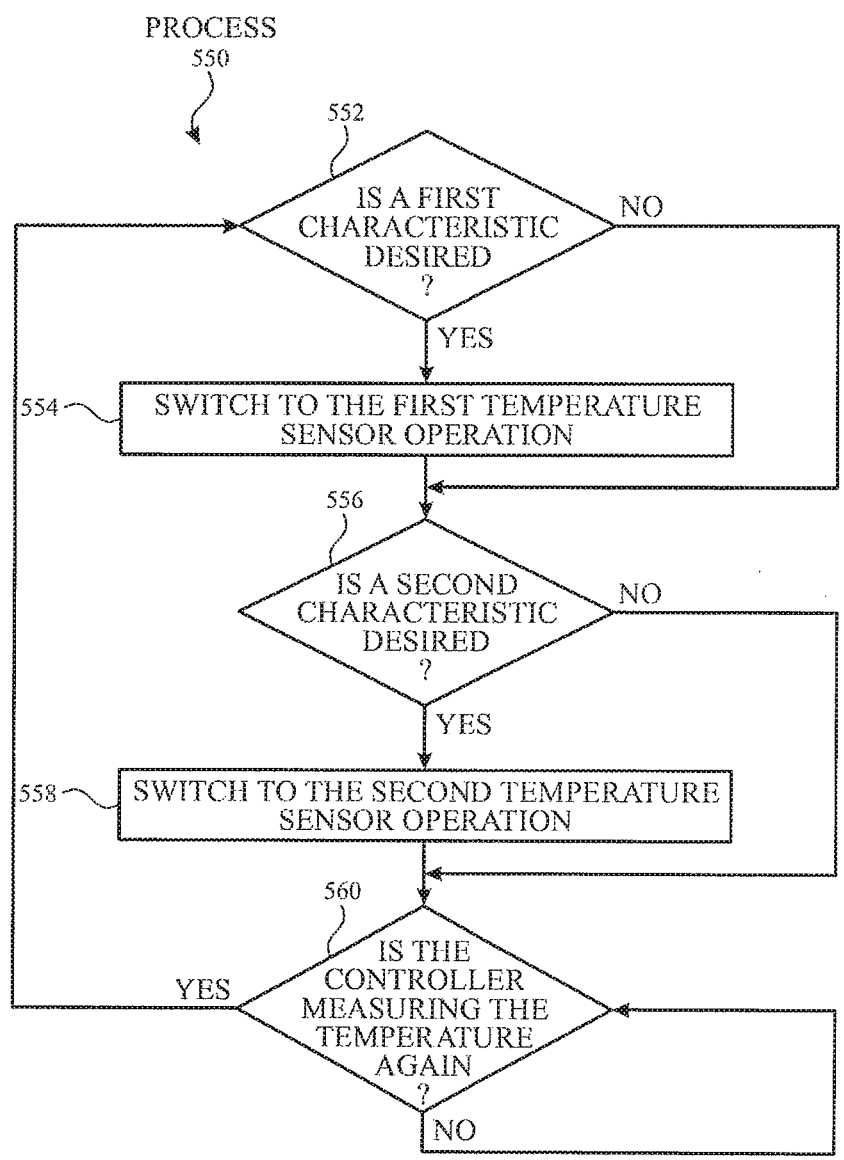
FIG. 5B illustrates an exemplary method for dynamically changing the temperature sensor operation according to examples of the disclosure.

Examples of the disclosure can include using both types of temperature sensor operations as illustrated in FIGS. 3 and 4A. FIG. 5B illustrates an exemplary method for dynamically changing the temperature sensor operation according to examples of the disclosure. It can be recognized from the figures above that transistors 312 and 316 in FIG. 3 can directly correspond to transistors 412 and 410 (respectively) in FIG. 4A. A controller or processor can select which temperature sensor operation based on one or more characteristics. For example, the controller can determine whether a first characteristic (e.g., lower power consumption) is desired (step 552 of process 550). If the first characteristic is desired, then the controller can switch to the first temperature sensor operation (step 554 of process 550). The first temperature sensor operation can include, for example, measuring the temperature using lower currents corresponding to a subthreshold region of operation of the TFTs (e.g., currents from current source 436 and current source 438 illustrated in FIG. 4A). The controller can determine whether a second characteristic (e.g., enhanced measurement accuracy) is desired (step 556 of process 550). If the second characteristic is desired, then the controller can switch to the second temperature sensor operation (step 558 of process 550). The second temperature sensor operation can include, for example, measuring the temperature using higher currents (e.g., current from current source 336 illustrated in FIG. 3). If the first characteristic is not desired (e.g., step 552), the controller can determine whether the second characteristic is desired (e.g., step 556). The process can be repeated when the controller measures the temperature again (step 560 of process 550).

With dynamically changing the temperature sensor operations, the device can be capable of measuring a plurality of temperature values of the display while retaining the desired characteristics such as low power consumption and/or enhanced measurement accuracy. Examples of the disclosure can include measuring the temperature using both temperature sensor operations, comparing the values, and discarding (or averaging) the values.

Figure 6A:
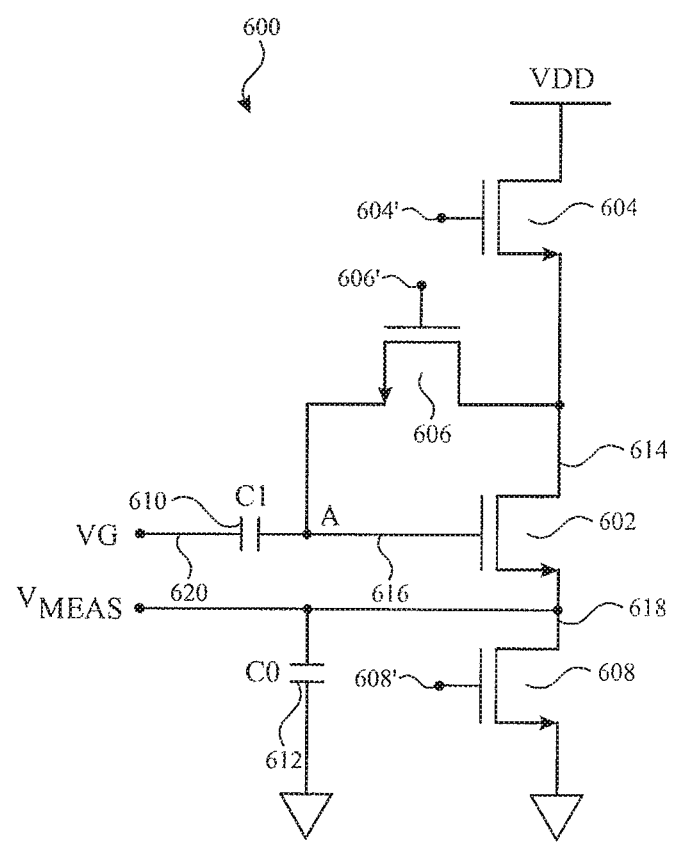
FIG. 6A illustrates an exemplary temperature sensor according to examples of the disclosure.

FIG. 6A illustrates an exemplary temperature sensor circuit 600 according to examples of the disclosure. In some examples, temperature sensor transistor 602 can be a MOSFET, TFT, or other type of transistor. Temperature sensor transistor 602 can be coupled to a temperature sensor circuit 600 to create a threshold compensated temperature-dependent current, as will be described. Temperature sensor circuit 600 can include VDD transistor 604, gate transistor 606, source transistor 608, gate capacitor 610, storage capacitor 612, and temperature sensor transistor 602, for example. In some examples, gate capacitor 610 can be coupled to a drive voltage 620. Temperature sensor transistor 602 can have a drain 614, gate 616, and source 618, for example.

In some examples, the drain of VDD transistor 604 can be coupled to power supply VDD, and the source can be coupled to both the drain of gate transistor 606 and the drain 614 of temperature sensor transistor 602. The source of gate transistor 606 can be coupled to the gate 616 of temperature sensor transistor 602 and gate capacitor 610, for example. In some examples, the drain of source transistor 608 can be coupled to the source 618 of temperature sensor transistor 602, and the source can be coupled to GND. The drain of source transistor 608 can be further coupled to a first terminal of storage capacitor 612, for example. Second terminal of storage capacitor 612 can be coupled to ground.

Although temperature sensor transistor 602 is illustrated as being an N-channel MOSFET, in some examples, other transistor types (e.g., P-channel MOSFET) can be used. Further, although VDD transistor 604, gate transistor 606, and source transistor 608 are illustrated as being N-channel MOSFETs, in some examples, other switches, transistors, and/or components are possible. The operation of temperature sensor circuit 600 will now be described with reference to FIG. 6B.

Figure 6B:
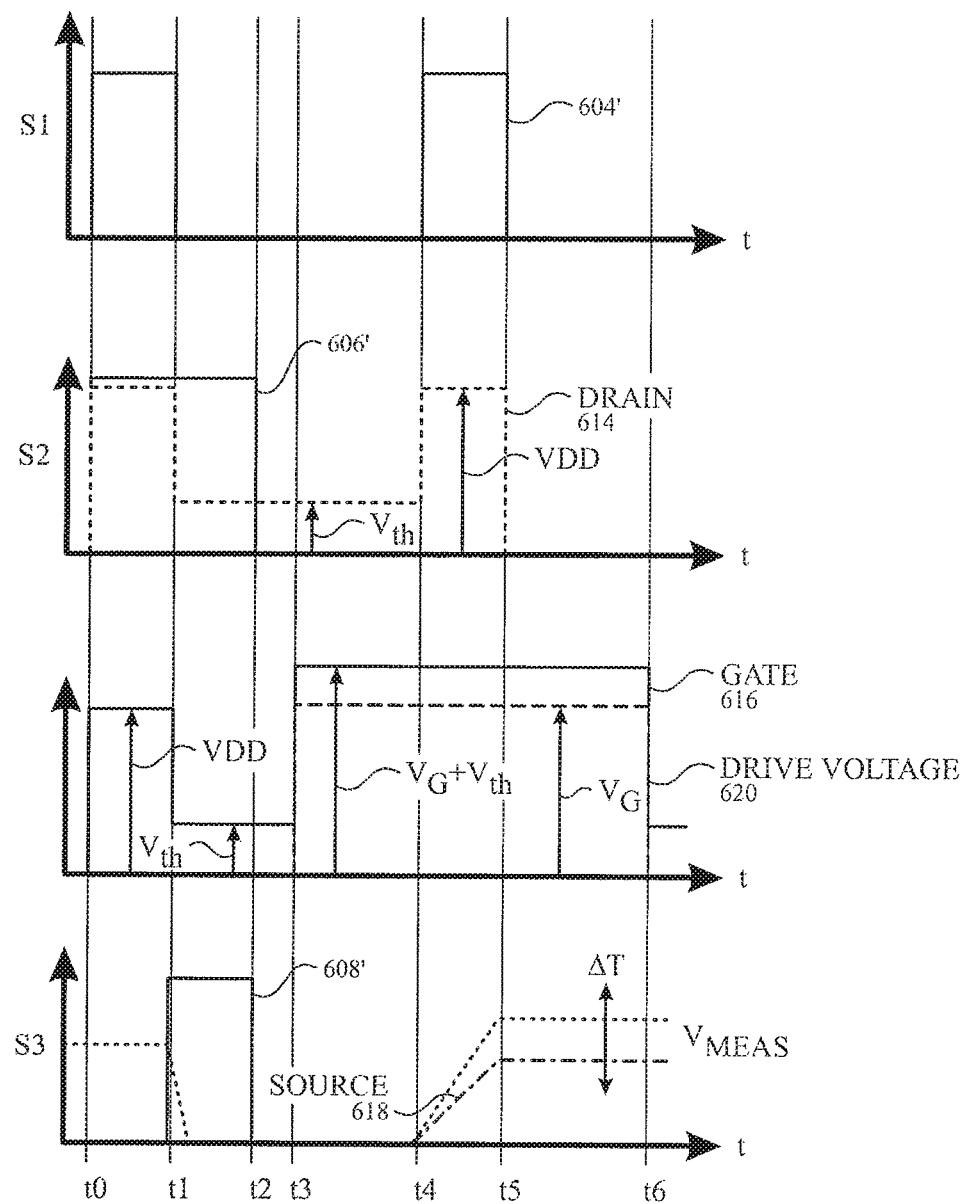
FIG. 6B illustrates an exemplary timing diagram for the operation of circuit to sense temperature sensor according to examples of the disclosure.

FIG. 6B illustrates an exemplary timing diagram for the operation of temperature sensor circuit 600 to temperature based on temperature sensor transistor 602 according to examples of the disclosure. As will be described below, in some examples, temperature sensor circuit 600 can be operated to cause temperature sensor transistor 602 to produce a threshold voltage compensated temperature-dependent current. The temperature dependent current can cause a charge to accumulate at different rates on storage capacitor 612, resulting in a temperature-dependent voltage at the source 618 of the temperature sensor transistor 602. The temperature-dependent voltage can be measured to determine temperature, for example. In the plots of FIG. 6B, each plot illustrates one or more voltages that can be present at specific nodes in the circuit 600 illustrated in FIG. 6A. The first plot in FIG. 6B illustrates a voltage that can be applied to the gate of VDD transistor 604 labeled as 604'. The second plot in FIG. 6B illustrates a voltage that can be applied to the gate of gate transistor 606 (labeled as 606') and a voltage at drain 614. The third plot in FIG. 6B illustrates a voltage at gate 616 and a voltage that can be applied at drive voltage 620. The fourth plot in FIG. 6D illustrates a voltage that can be applied to the gate of source transistor 608 (labeled as 608') and a voltage at source 618 (i.e., a voltage across capacitor 612).

From time $t_0$ to $t_1$, VDD transistor 604 can be activated (e.g., by a applying a high voltage to the gate of the VDD transistor) to apply a voltage VDD to the drain 614 of temperature sensor transistor 602 and the drain of gate transistor 606. Starting at $t_0$, gate transistor 606 can also be activated (e.g., by applying a high voltage to the gate of the gate transistor) to apply a voltage of VDD to the gate 616 of temperature sensor transistor 602. In this manner, from $t_0$ to $t_1$, the source 618 of temperature sensor transistor 602 can have a positive voltage that can be equal to VDD minus the gate to source voltage ($V_{gs}$) of the temperature sensor transistor.

In some examples, from $t_1$ to $t_2$, gate transistor 606 can continue to be activated and source transistor 608 can become activated. The voltage of the source 618 of temperature sensor transistor 602 can cause a current to flow through the source transistor 608, for example. In some examples, the voltage of the source 618 of the temperature sensor transistor 602 can become equal to ground as the accumulated charge on storage capacitor 612 can be discharged through source transistor 608. At $t_1$, VDD transistor 604 can be deactivated, which can cause the drain 614 of temperature sensor transistor 602 to be at a floating voltage level. Likewise, the gate 616 of temperature sensor transistor 602 can also be at a floating voltage level. In some examples, as current flows through transistor 602, the floating voltage level of drain 614 and gate 616 can decrease until the voltage level reaches a threshold voltage of the temperature sensor transistor 602 and current flow cuts off.

From $t_2$ to $t_3$, gate transistor 606 and source transistor 608 can be deactivated, for example. In some examples, the source 614 and gate 616 of temperature sensor transistor 602 can remain at the same voltage level, which can be equal to the threshold voltage of the temperature sensor transistor 602. The source 618 of temperature sensor transistor 602 can remain at a voltage level equal to GND, for example.

In some examples, from $t_3$ to $t_4$, a drive voltage 620 can be applied to gate capacitor 610. The gate capacitor 610 can couple gate 616 of temperature sensor transistor 602 to the drive voltage 620, for example. Accordingly, the voltage of the gate 616 of the temperature sensor transistor 602 can, for example, be equal to the sum of the drive voltage 620 and the threshold voltage of the temperature sensor. In some examples, variations in threshold voltage of temperature sensor 602 can be canceled out by pre-charging the gate 616 of the temperature sensor transistor with the threshold voltage as described above. In some examples, the source 618 of temperature sensor transistor 602 can continue to have a voltage equal to ground. The drain 614 of temperature sensor transistor 602 can continue to have a floating voltage, which can be equal to the threshold voltage of temperature sensor transistor 602, for example.

In some examples, from $t_4$ to $t_5$ VDD transistor 604 can be activated, which can cause the drain 614 of temperature sensor transistor 602 to have a voltage level of VDD. Accordingly, a path for current flow can be created through VDD transistor 604 and current can flow through temperature sensor transistor 602, for example. In some examples, the amount of current flowing through temperature sensor transistor 602 can be dependent on the temperature of temperature sensor transistor 602. The current flowing through temperature sensor 602 can cause storage capacitor 612 to accumulate a voltage at the source 618 of the temperature sensor transistor 602 at a rate proportional to the current. Accordingly, the time from $t_4$ to $t_5$ can be an integration window of the temperature sensor transistor 602 current.

From $t_5$ to $t_6$, VDD transistor 604 can be deactivated, for example. In some examples, from $t_5$ to $t_6$, the voltage of the source 618 of the temperature sensor transistor 602 can remain a constant value. The voltage at source 618 can be sampled to determine the temperature of temperature sensor transistor 602.

Figure 7A:
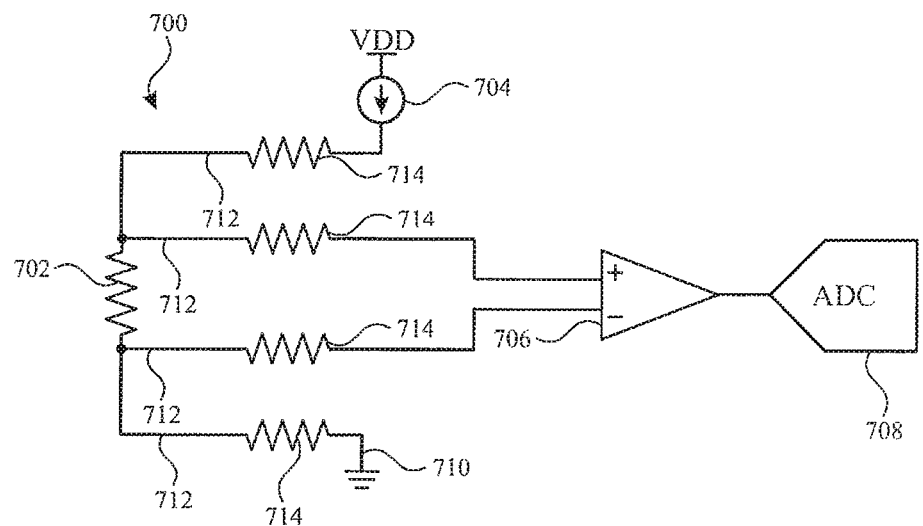
FIG. 7A illustrates exemplary sense circuitry for sampling a temperature sensor according to examples of the disclosure.

FIG. 7A illustrates exemplary sense circuitry 700 for sampling a temperature sensor 702 according to examples of the disclosure. In some examples, circuitry 700 can include a temperature sensor 702, a current source 704, an amplifier 706, and an ADC 708. The temperature sensor 702 can be coupled to the current source 704, amplifier 706, and ground 710 through routing traces 712, for example. In some examples, routing traces 712 can have resistances 714.

During operation, current source 704 can apply a current through temperature sensor 702, for example. In some examples, a voltage across the temperature sensor 702 can be measured at amplifier 706. The output of amplifier 706 can be converted from an analog signal to a digital signal at ADC 708 for further processing. In some examples, a processor or controller can be operatively coupled to ADC 708 to receive a signal indicative of voltage across temperature sensor 702. The resistance of the temperature sensor 702 can be determined based on the received signal, the known current at current source 704 and the known resistances 714 of routing traces 712. In some examples, the resistance of temperature sensor 702 can be indicative of its temperature. For example, resistance can be correlated to temperature as shown below in FIG. 7B.

Figure 7B:
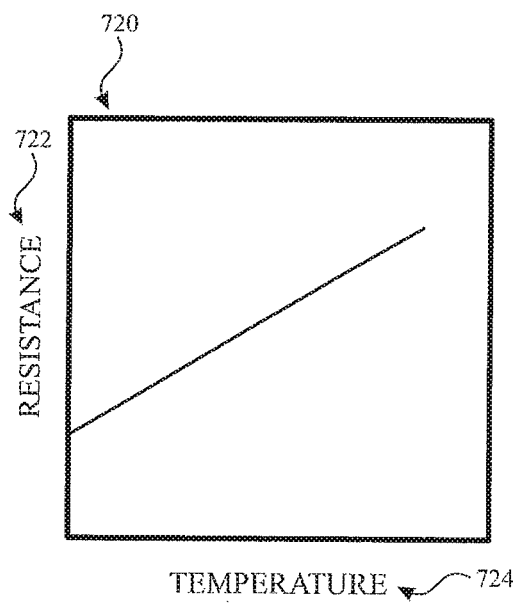
FIG. 7B illustrates an exemplary graph of the correlation between temperature and resistance of a temperature sensor according to examples of the disclosure.

FIG. 7B illustrates an exemplary graph 720 of the correlation between temperature 722 and resistance 724 of a temperature sensor according to examples of the disclosure. In some examples, as shown in graph 720, as temperature 724 increases, the resistance 722 of temperature sensor 702 can increase. Graph 720 can be determined based on a calibration procedure in which known temperatures are applied to temperature sensor 702 while measuring its resistance, for example. In some examples, the calibration data can be used to determine a function or a lookup table (LUT) for calculating temperature based on the resistance of temperature sensor 702.

Figures 7C, 7D:
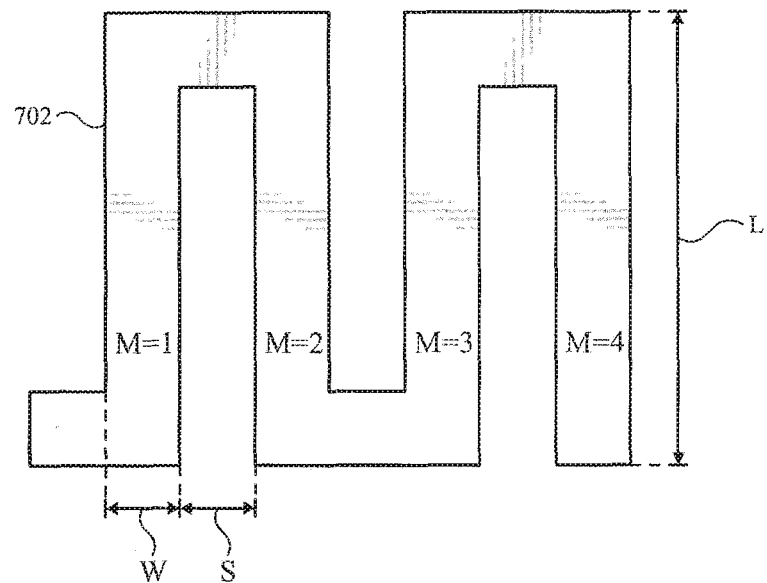
FIG. 7C illustrates an exemplary temperature sensor according to examples of the disclosure.
FIG. 7D illustrates a table of exemplary temperature sensor dimensions according to examples of the disclosure.

FIG. 7C illustrates an exemplary temperature sensor 702 according to examples of the disclosure. In some examples, temperature sensor 702 can have a zig-zag shape including a plurality of turns M. Temperature sensor 702 can have a trace width W, turn length L, and a space S between each turn M, for example. In some examples, temperature sensor 702 can be made of a conductive material, such as ITO. Other conductive materials are possible.

FIG. 7D illustrates a table 730 of exemplary temperature sensor 702 dimensions according to examples of the disclosure. Table 730 includes exemplary dimensions for three temperature sensors 732, 734, and 736, for example. Temperature sensor 732 can have a trace width W of 4 micrometers, a turn spacing of 4 micrometers, a turn length L of 150 micrometers, and 20 turns M, for example. Temperature sensor 734 can have a trace width W of 8 micrometers, a turn spacing of 4 micrometers, a turn length L of 300 micrometers, and 20 turns M, for example. Temperature sensor 736 can have a trace width W of 12 micrometers, a turn spacing of 4 micrometers, a turn length L of 450 micrometers, and 20 turns M, for example. Additional or alternative dimensions are possible. In some examples, temperature sensors 732, 734, and 736 can be coupled to sense circuitry (e.g., sense circuitry 700) and have a zig-zag shape similar to temperature sensor 702.

Figure 7E:
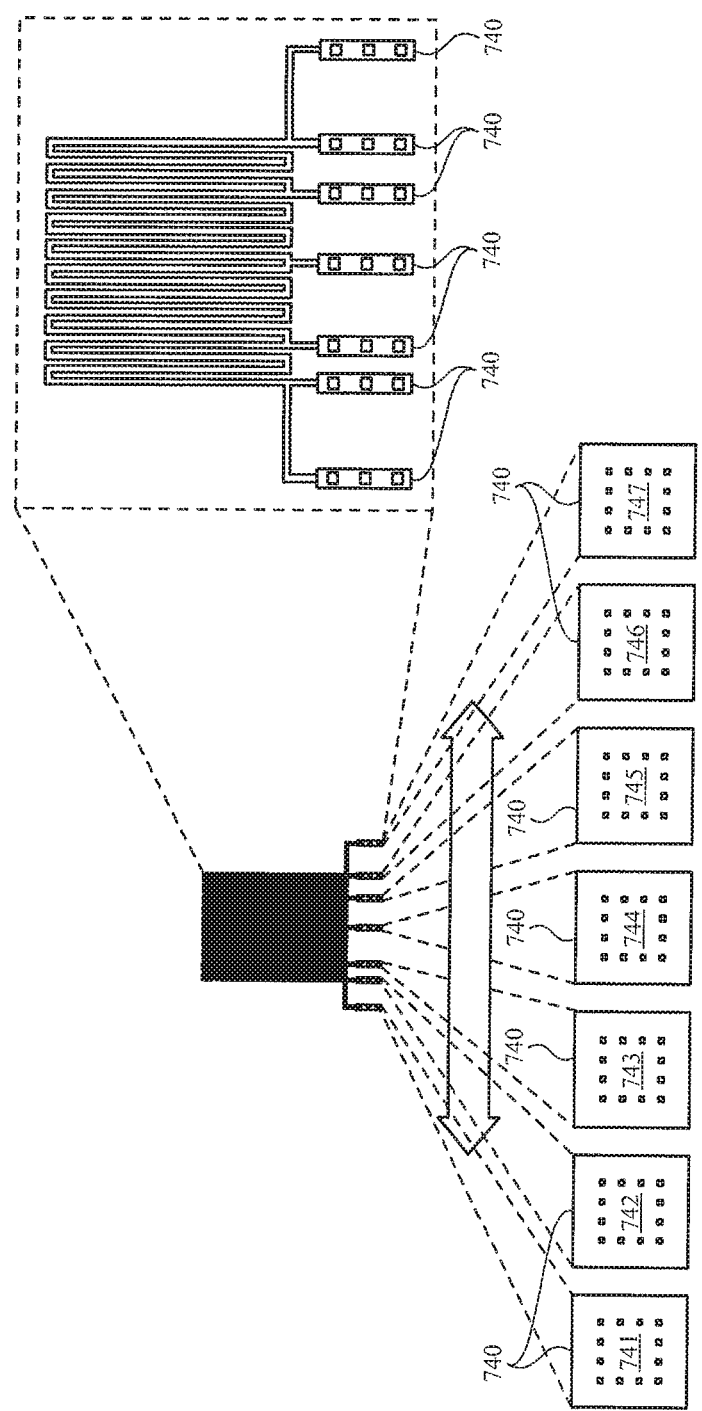
FIG. 7E illustrates an exemplary temperature sensor with a plurality of connection points according to examples of the disclosure.

FIG. 7E illustrates an exemplary temperature sensor 702 with a plurality of connection points 740 according to examples of the disclosure. Connection points 740 can include input connection 741, V+ connection 742, a plurality of variable V− connections 743, 744, 745, and 746 and GND connection 747, for example. In some examples, variable V− connections 743, 744, 745, and 746 can be at locations separated from V+ connection 742 by a plurality of the sensor's turns M. For example, variable V− connection 743 can be located at M=4, variable V− connection 744 can be located at M=10, variable V− connection 745 can be located at M=16, and variable V− connection 746 can be located at M=20. Accordingly, a voltage of the temperature sensor 702 can be measured across a selected number of turns M, as will be described below.

In some examples, connection points 740 can be used to couple temperature sensor 702 to sense circuitry 700. For example, temperature sensor 702 can be coupled to current source 704 via input connection 741. In some examples, the positive terminal of amplifier 706 can be coupled to V+ connection 742. GND connection 747 can be used to couple the temperature sensor 702 to ground 710, for example. In some examples, variable V− connections 743, 744, 745, and 746 can be used to couple temperature sensor 702 to the negative terminal of amplifier 706 at one of several possible locations on the temperature sensor.

In some examples, measuring the voltage across a greater number of turns M of force sensor 702 can increase the output voltage at all temperatures. Likewise, in some examples, measuring the voltage across a lower number of turns M of force sensor 702 can decrease the output voltage at all temperatures. Therefore, a variable V− connection 743, 744, 745, and 746 can be selected based on a number of factors including, but not limited to, the dynamic range of amplifier 706 and/or a desired signal to noise ratio (SNR) of the output voltage across temperature sensor 702 voltage.

Therefore, according to the above, some examples of the disclosure are directed to a temperature sensor comprising: a sense transistor coupled to readout circuitry; and a threshold voltage compensation circuit coupled to the sense transistor, wherein the threshold voltage compensation circuit is configured to compensate for a threshold voltage of the sense transistor. Additionally or alternatively to one or more of the examples disclosed above, in some examples, the threshold voltage compensation circuit compensates for the threshold voltage of the sense transistor by pre-charging a gate electrode of the sense transistor to the threshold voltage of the sense transistor. Additionally or alternatively to one or more of the examples disclosed above, in some examples, compensating for the threshold voltage of the sense transistor comprises: coupling the gate electrode and the drain electrode of the transistor together, coupling the gate electrode and the drain electrode of the transistor to a reference voltage level, uncoupling the gate electrode and the drain electrode from the reference voltage level, maintaining coupling of the gate electrode and the drain electrode while a gate voltage at the gate electrode of the transistor discharges, and uncoupling the gate electrode and the drain electrode. Additionally or alternatively to one or more of the examples disclosed above, in some examples, the readout circuitry is configured to apply a readout voltage to the sense transistor and sample an output current of the sense transistor. Additionally or alternatively to one or more of the examples disclosed above, in some examples, the readout voltage is added to the gate voltage at the gate electrode after compensation for the threshold voltage of the sense transistor.

Some examples of the disclosure are directed to an apparatus comprising: a display panel comprising a plurality of display pixels, a plurality of temperature sensors disposed at different portions the display panel, wherein the plurality of temperature sensors comprise ratioed pairs of thin film transistors and the ratioed pairs of thin film transistors are formed on the display panel, and control circuitry for changing illumination properties of the plurality of display pixels based on changes is temperature detected by a proximate temperature sensor of the plurality of temperature sensors. Additionally or alternatively to one or more of the examples disclosed above, in some examples, the control circuitry is further configured to: operate the plurality of temperature sensors in a first mode having a first power consumption level; determining whether a battery level of the apparatus falls below a threshold level; and in accordance with a determination that the power level has fallen below the threshold level, operate the plurality of temperature sensors in a second mode having a second power consumption level, lower than the first power level. Additionally or alternatively to one or more of the examples disclosed above, in some examples, the second corresponds to operating the plurality of temperature sensors in a sub-threshold region of the ratioed pairs of thin firm transistors included in each respective temperature sensor.

Some examples of the disclosure are directed to a method comprising: operating temperature sensor proximate to a display pixel in a display in a first temperature sensing mode, determining whether a first characteristic of the temperature sensor is desired, and in accordance with a determination that the first characteristic of the temperature sensor is desired, switching to a second temperature sensing mode. Additionally or alternatively to one or more of the examples disclosed above, in some examples, the first temperature sensing mode is a high accuracy mode and the second temperature sensor is a low power consumption mode. Additionally or alternatively to one or more of the examples disclosed above, in some examples, the lower power consumption mode comprises operating at least one transistor of the temperature sensor in a subthreshold current region. Additionally or alternatively to one or more of the examples disclosed above, in some examples, the first characteristic is a reduced power consumption, and the determination of whether reduced power consumption is desired comprises comparing a battery power level of an electronic device including the display to a threshold battery power level.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An apparatus comprising:
a display panel comprising display pixels;
a plurality of temperature sensors, the plurality of temperature sensors comprising transistors formed on a transistor layer in proximity to the display pixels, wherein the transistors of the plurality of temperature sensors are disposed within the display panel at different portions of the display panel; and
control circuitry for:
changing illumination properties of a first plurality of the display pixels based on a first temperature detected by a first temperature sensor of the plurality of temperature sensors in proximity to the first plurality of the display pixels; and
changing illumination properties of a second plurality of the display pixels based on a second temperature, different from the first temperature, detected by a second temperature sensor of the plurality of temperature sensors in proximity to the second plurality of the display pixels.

2. The apparatus of claim 1, wherein the transistor layer is disposed between a backlight and a color filter substrate of the display panel.

3. The apparatus of claim 1, wherein the first temperature sensor of the plurality of temperature sensors comprises:
a sense transistor configured to generate a temperature-dependent current; and
a threshold voltage compensation circuit coupled to the sense transistor, wherein the threshold voltage compensation circuit is configured to compensate for a threshold voltage of the sense transistor.

4. The apparatus of claim 3, wherein the threshold voltage compensation circuit compensates for the threshold voltage of the sense transistor by pre-charging a gate electrode of the sense transistor to the threshold voltage of the sense transistor.

5. The apparatus of claim 4, wherein compensating for the threshold voltage of the sense transistor comprises:
- coupling the gate electrode of the sense transistor and a drain electrode of the sense transistor together;
- coupling the gate electrode of the sense transistor and the drain electrode of the sense transistor to a reference voltage level;
- uncoupling the gate electrode of the sense transistor and the drain electrode of the sense transistor from the reference voltage level;
- maintaining coupling of the gate electrode of the sense transistor and the drain electrode of the sense transistor while a gate voltage at the gate electrode of the sense transistor discharges to the threshold voltage of the sense transistor; and
- uncoupling the gate electrode of the sense transistor and the drain electrode of the sense transistor.

6. The apparatus of claim 5, wherein generating the temperature-dependent current comprises applying a drive voltage to the gate electrode of the sense transistor.

7. The apparatus of claim 6, wherein the drive voltage is added to the threshold voltage of the sense transistor at the gate electrode of the sense transistor.

8. A method comprising:
- operating temperature sensor proximate to a display pixel in a display in a first temperature sensing mode;
- determining whether a first characteristic of the temperature sensor is desired; and
- in accordance with a determination that the first characteristic of the temperature sensor is desired, switching to a second temperature sensing mode.

9. The method of claim 8, wherein the first temperature sensing mode is a high accuracy mode and the second temperature sensor is a low power consumption mode.

10. The method of claim 9, wherein the low power consumption mode comprises operating at least one transistor of the temperature sensor in a subthreshold current region.

11. The method of claim 8, wherein the first characteristic is a reduced power consumption, and the determination of whether reduced power consumption is desired comprises comparing a battery power level of an electronic device including the display to a threshold battery power level.

12. The apparatus of claim 3, wherein the first temperature sensor of the plurality of temperature sensors is configured to sample a temperature-dependent voltage at a source of the sense transistor resulting from generating the temperature-dependent current.

13. The apparatus of claim 3, wherein the first temperature sensor of the plurality of temperature sensors further comprises a capacitor coupled between a source electrode of the sense transistor and ground.

14. The apparatus of claim 13, wherein the capacitor is configured to accumulate charge from the temperature-dependent current.

15. The apparatus of claim 14, wherein the first temperature sensor of the plurality of temperature sensors further comprises a discharge transistor coupled between the source electrode of the sense transistor and ground, wherein the discharge transistor is configured to discharge the capacitor prior to generating the temperature-dependent current.

16. The apparatus of claim 6, wherein the drive voltage is applied to the gate electrode of the sense transistor via an input capacitor.

17. The apparatus of claim 5, wherein:
- coupling the gate electrode of the sense transistor and the drain electrode of the sense transistor together comprises activating a first switching transistor coupled between the gate electrode of the sense transistor and the drain electrode of the sense transistor;
- coupling the gate electrode of the sense transistor and the drain electrode of the sense transistor to the reference voltage level comprises activating a second switching transistor coupled between the drain electrode of the sense transistor and a power supply at the reference voltage level;
- uncoupling the gate electrode of the sense transistor and the drain electrode of the sense transistor from the reference voltage level comprises deactivating the second switching transistor;
- maintaining coupling of the gate electrode of the sense transistor and the drain electrode of the sense transistor comprises maintaining activation of the first switching transistor; and
- uncoupling the gate electrode of the sense transistor and the drain electrode of the sense transistor comprises deactivating the first switching transistor.

* * * * *